United States Patent

[11] 3,564,134

[72] Inventors Richard O. Rue;
Vance L. Hansen, China Lake, Calif.
[21] Appl. No. 742,389
[22] Filed July 3, 1968
[45] Patented Feb. 16, 1971
[73] Assignee the United States of America as represented by the Secretary of the Navy

[54] TWO-CAMERA REMOTE DRONE CONTROL
7 Claims, 2 Drawing Figs.

[52] U.S. Cl. .................................................. 178/6.8;
244/77
[51] Int. Cl. ..................................................... H04n 5/22,
H04n 5/74
[50] Field of Search ........................................... 178/6
(IND), 6.8; 244/77C

[56] References Cited
UNITED STATES PATENTS
2,515,254 7/1950 Nosker .......................... 250/2
2,792,190 5/1957 Seibold .......................... 244/14
3,180,932 4/1965 Oppenheimer ............... 178/6.8
3,181,809 5/1965 Lobelle ......................... 244/1
3,288,927 11/1966 Plump ........................... 178/7.5
3,311,017 3/1967 Eckholm ....................... 88/24
3,469,260 9/1969 Holt et al. ..................... 343/6

OTHER REFERENCES
TELEVISION NEWS March—April 1931 " THE RADIO-CONTROLLED TELEVISION PLANE" pages 10, 11, 75, 76 copy in 178—6 IND Primary Examiner—Richard Murray
Assistant Examiner—Richard K. Eckert, Jr.
Attorney—George J. Rubens and Roy Miller ABSTRACT: A system for flying a drone aircraft by remote control wherein a first television camera, with an ultrawide angle lens mounted thereon, is placed in the cockpit of the drone aircraft where the head of the pilot is normally located; a second television camera, with a zoom lens mounted thereon, is placed in the nose of the drone aircraft; means are provided to send the pictures from either camera back to the ground where they are projected, using rear projection means, onto a hemispherical viewing screen; and a remote ground control is provided for flying the drone in response to the pictures received from the cockpit or nose television cameras or both.

PATENTED FEB 16 1971

INVENTORS.
RICHARD O. RUE
VANCE L. HANSEN
BY
ROY MILLER
ATTORNEY.

TWO-CAMERA REMOTE DRONE CONTROL

BACKGROUND OF THE INVENTION

Many systems used for control of drone aircraft depend upon close visual watch of the aircraft from the ground and from chase planes which follow the drone in flight. An array of on-off function switches with a two-way telemetry link give a display of the drone instruments to a ground controller. The ground controller, while visually observing the drone, uses a set of remote drone controls to cause the plane to take off. As soon as the drone leaves the ground, a chase plane pilot in close visual contact with the drone takes over control, flying both his chase plane and the drone. A second faster chase plane takes over controls when necessary. On landing, the procedure is reversed.

In the above systems, no attempt is made to provide simulation of actual cockpit controls, therefore, time is wasted familiarizing ground controllers and chase plane pilots with the control system. A controller, either on the ground or piloting a chase plane, is handicapped by the unnaturalness of the control system and by the lack of capability for assessing the yaw, pitch and roll of the drone. In an emergency situation, possible loss of control could be averted if there was simulation of cockpit control.

It is therefore desirable to provide a realistic 180° view from the cockpit of a drone to simulate cockpit flying.

A copending patent application of Richard O. Rue, Floyd A. Kinder and Vance L. Hansen, Ser. No. 677,789 filed Oct. 24, 1967, for a "Remote Control Flying System" discloses an ultrawide angle lens mounted on a television camera which is located in the cockpit of a drone aircraft. Transmission means are provided to send the pictures back to the ground where they are projected, using rear projection means, onto a hemispherical viewing screen. A ground controller flies the drone in response to the pictures received from the cockpit television camera.

This system had the disadvantage that it was difficult to distinguish far field objects, with respect to the drone, because of poor angular resolution.

SUMMARY OF THE INVENTION

In accordance with the present invention, a first television camera equipped with a lens having a 180° field of view is mounted in the cockpit of a drone aircraft where the head of the pilot is normally located. A second television camera equipped with a zoom lens is mounted in the nose of the drone aircraft. The signal from the television cameras are received by a mixer which is capable of projecting, via a television projector, either the view from the cockpit television camera, the view from the nose television camera, or both superposed upon one another.

The television projector projects the view from the television cameras onto the convex surface of a translucent hemisphere. A ground controller observing the projection from the center of curvature of the hemisphere is presented with an undistorted view from the drone.

A simulated cockpit with controls identical to the drone to be flown is constructed adjacent to the translucent hemisphere. Thus, the ground controller can view the hemisphere and fly the drone in response to the view from the hemisphere to simulate cockpit flying.

DESCRIPTION OF THE PREFERRED EMBODIMENT

Figure 1:
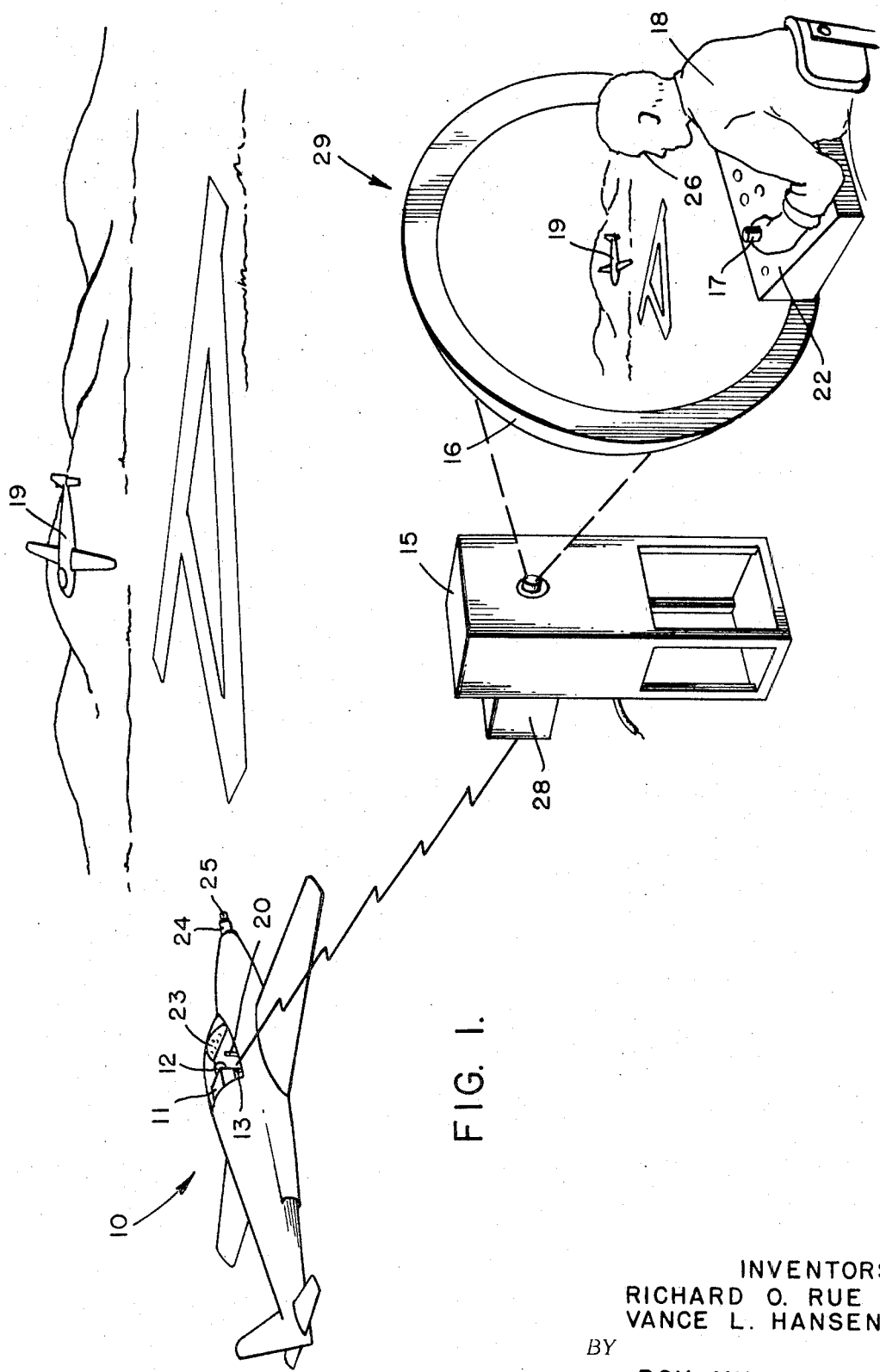
FIG. 1 illustrates a drone aircraft with a first television camera mounted in the cockpit of the drone aircraft and a second television camera mounted in the nose of the drone aircraft flying over terrain; and the ground controller sitting in his simulated cockpit with the view of the terrain displayed before him.
Figure 2:
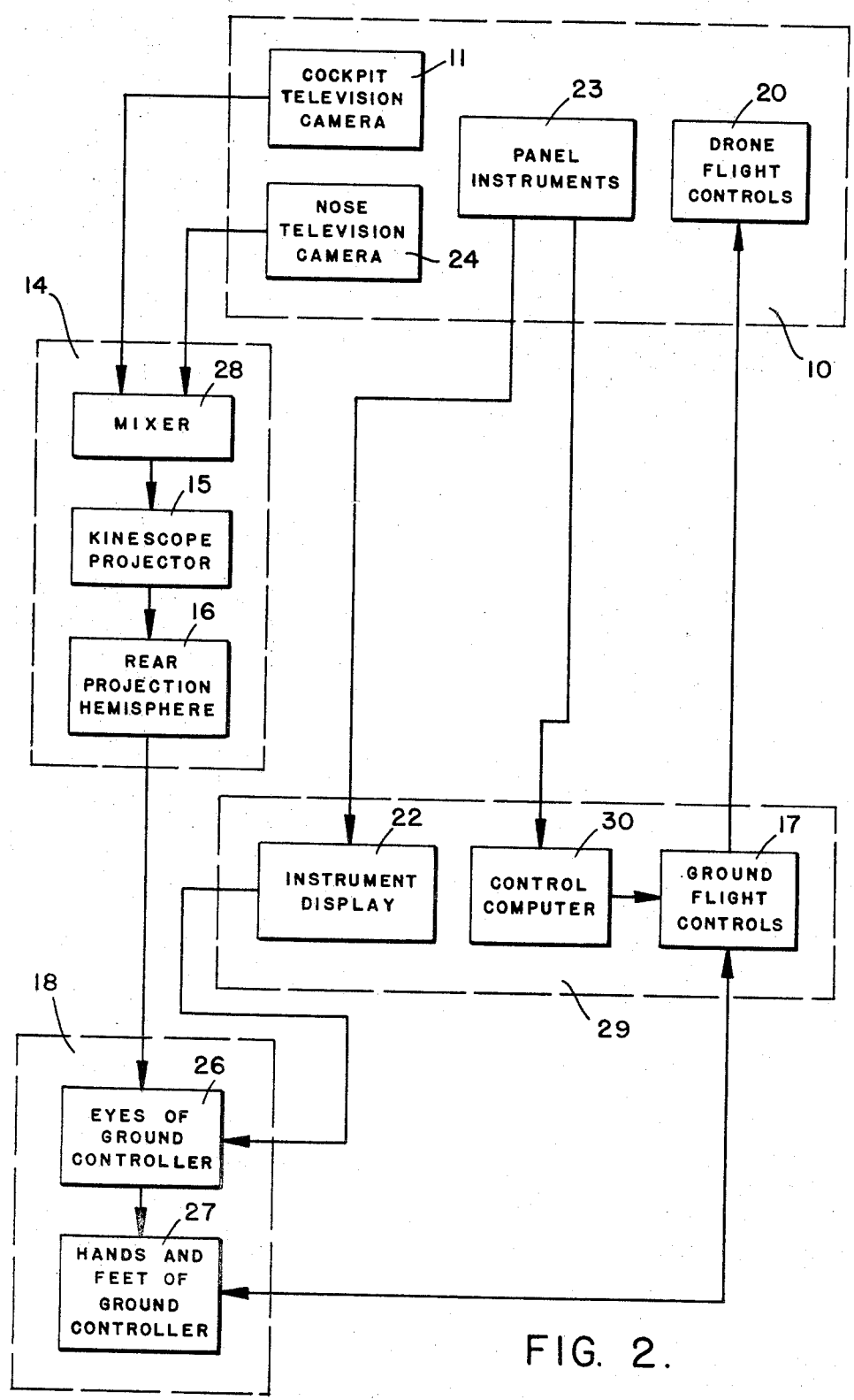
FIG. 2 is a block diagram of the system.

As shown in FIGS. 1 and 2, a first television camera 11, which is held in place by support 13, is mounted in the cockpit of drone aircraft 10 so that a lens 12 on the television camera is located where the head of the pilot would normally be. Television camera 11 may be equipped with an ultrawide angle lens having a 180° field of view.

A second television camera 24 is located in the nose of drone aircraft 10 and may be equipped with a zoom lens 25. Television cameras 11 and 24 transmit signals which are received by mixer 28. Mixer 28 has the capability of selecting either the signal from camera 11 and projecting it onto the full face of hemisphere 16, or selecting the signal from camera 24 and projecting it onto the central portion of hemisphere 16, or the signal received from camera 11 may be projected full face onto hemisphere 16 and additionally the signal from camera 24 may be superposed upon a central portion of the hemisphere thereby blanking out that portion of the signal received from camera 11.

Projection by television projector 15 is onto the convex surface of translucent hemisphere 16. Television projector 15 may be a kinescope projector, or a controlled layer system such as the Eidophor System manufactured by Gretag, Limited of the Netherlands. Hemisphere 16 may be constructed of glass, plexiglass or the like with a prepared surface to permit rear projection viewing from the concave slide.

To operate the system, ground controller 18 places himself in front of a remote control console 29 such that his eyes 26 are placed at approximately the center of curvature of hemisphere 16. Ground controller 18 may then activate television camera 11 or television camera 24 or both in combination to transmit pictures via mixer 28 to television projector 15 which projects onto the convex surface of hemisphere 16 for display on its concave surface.

The ground controller now has a view which is not dissimilar to that which he would have if he were in the cockpit of drone aircraft 10.

Using his ground flight controls 17, ground controller 18 operates drone flight control 20 which in turn flies drone aircraft 10. The ground controller is now able to cause drone aircraft 10 to begin flight. During this phase of flight ground controller 18 would most likely use the ultrawide angle lens on television camera 11 which is mounted on the cockpit of the drone.

Once in flight, drone panel instruments 23 have their readings transmitted to instrument display 22 which is readily visible to ground controller 18. When the ground controller observes an object 19 approaching his drone aircraft 10, using ground flight controls 17, he can cause drone aircraft 10 to avoid the object. If the object is located far from drone aircraft 10, ground controller 18 may wish to use television camera 24 with zoom lens 25 extended to its maximum focal length to produce the best image of the object. In this mode, only the central portion of the hemisphere is used to minimize distortion.

To enable the ground controller to look at one spot on the hemisphere close up, means are provided to point the camera with the zoom lens at that spot, and then project the image of the far spot onto a central portion of the hemisphere. This particular embodiment permits a pilot to "zoom in" on a given area, and then superpose the specific area upon the center of the hemisphere to give a closeup view.

It is within the scope of this invention to use a first and a second kinescope projector for transmittal of the images from television cameras 11 and 24, respectively. If two kinescope projectors are used, then the image projected from the zoom lens mounted on camera 24, which is in the nose of drone aircraft 10, will be projected full raster upon hemisphere 16. This projection of the full raster improves quality over a partial raster scheme which must be used when employing only a single kinescope projector. By using a control computer 30, which is operatively connected to drone aircraft 10, the ground controller can cause the drone to fly in response to automatic commands generated by control computer 30. Control computer 30 additionally receives feedback commands from panel instruments 23 to provide a closed servoloop.

Should drone aircraft 10 crash, means are provided for ejecting television cameras 11 and 24, and lenses 12 and 25 to permit recovery.

Thus, the system permits a drone aircraft to be flown entirely from the ground without necessitating the use of chase planes as had been done previously. In another embodiment, panel instruments 23 may be included in the signal transmitted by television camera 11 by adjusting television camera 11 to include the panel instruments in its field of view. It should be noted that a flat-faced kinescope may be used, however, this method has the disadvantage of barrel distortion.

When a cockpitless drone is desired to be flown, television camera 11 may be equipped with a turret lens and mounted on the vertical stabilizer of such a drone. In this embodiment the single television camera used has both a wide angle lens having a 180° field of view and a zoom lens mounted on the turret. Means are provided to shift the lens for the television camera from a wide angle mode to a zoom mode. In this manner only one television camera need be used, however, it becomes impractical to superpose the pictures from the zoom lens far field view upon the wide-angle view.

Various other modifications are contemplated and may obviously be resorted to by those skilled in the art without departing from the spirit and scope of the invention, as hereinafter defined by the appended claims.

The invention described herein may be manufactured and used by or for the Government of the United States of America for governmental purposes without the payment of any royalties thereon or therefor.

We claim:

1. A system for flying drone aircraft from the ground entirely by remote control comprising:
   a drone aircraft;
   a first television camera mounted in said drone aircraft, an ultrawide angle lens mounted on said television camera;
   a second television camera mounted in said drone aircraft, a zoom lens mounted on said second television camera;
   means for transmitting signals from said first and second television cameras;
   means for receiving said signals from the first and second television cameras;
   means for producing and displaying a picture from said signals including a kinescope projector and a hemisphere with a treated surface to display the pictures received by said kinescope projector, wherein said kinescope projector projects onto the convex surface of said hemisphere for viewing from the concave side of said hemisphere;
   means to alternatively select the picture from either the first or second kinescope projector for showing upon said hemisphere;
   means to superpose the picture from the zoom lens television camera upon the image from said wide angle television camera such that the central area of the hemisphere displays the image scanned by the zoom lens television camera and the remainder of the hemisphere displays the image scanned by the wide-angle lens television camera; and
   a set of remote controls operatively connected to the flight controls of the drone aircraft for flying said drone aircraft; so that
   a ground controller may view said picture and operate said remote flight controls in response to the pictures received from the first and second television cameras.

2. The system of claim 1 wherein said ultrawide-angle lens has a 180° field of view.

3. The system of claim 1 wherein the kinescope is a conventional cathode ray tube with a flat faceplate.

4. The system of claim 1 wherein two television projectors are used:
   the first television projector receives signals from a first television camera equipped with wide-angle lens;
   the second television projector receives signals from a second television camera equipped with a zoom lens; and
   means are provided for superposing the picture from said second television projector upon the picture from the first television projector.

5. The system of claim 1 wherein one of said television cameras is mounted on a cockpit seat with ejection means for recovery of said television camera.

6. The system of claim 1 wherein one of said television cameras is mounted on the outside fuselage of the drone aircraft.

7. The system of claim 1 wherein:
   one of said television cameras has provision for two lenses which are turret mounted;
   the first lens is a zoom lens; and
   the second lens is an ultrawide angle lens.